DISTORTION SIGNAL GENERATOR

Filed June 8, 1964

INVENTOR
ROBERT A. WAGHORNE

BY R. C. Terry
ATTORNEY

May 30, 1967 R. A. WAGHORNE 3,323,111

DISTORTION SIGNAL GENERATOR

Filed June 8, 1964 3 Sheets-Sheet 2

May 30, 1967 R. A. WAGHORNE 3,323,111

DISTORTION SIGNAL GENERATOR

Filed June 8, 1964 3 Sheets-Sheet 3

United States Patent Office 3,323,111

Patented May 30, 1967

3,323,111
DISTORTION SIGNAL GENERATOR

Robert A. Waghorne, Elmwood Park, Ill., assignor to Teletype Corporation, Skokie, Ill., a corporation of Delaware Filed June 8, 1964, Ser. No. 373,276
13 Claims. (Cl. 340—172.5)

Figure 1:
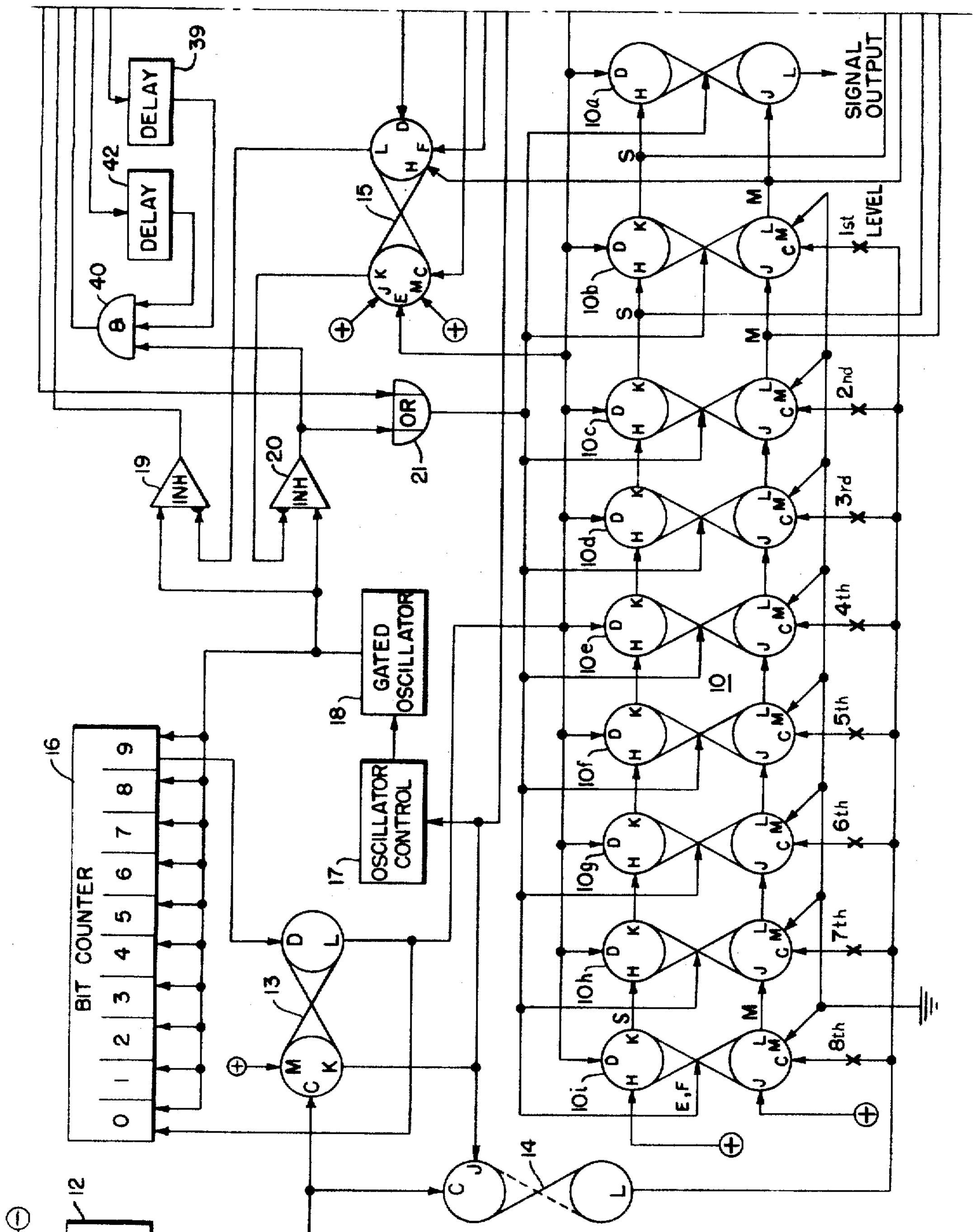

This invention relates to a distortion signal generator and more particularly to an electronic distortion signal generator for producing telegraph signals having predetermined amounts and types of distortion.

In order to check the capabilities of the telegraph signal receiving apparatus, it is often necessary to verify the performance of the various components in response to the receipt of signals having predetermined amounts of distortion therein. Each telegraph receiving apparatus must be capable of performing its designated functions upon receipt of signals that may have been distorted in either the signal generating means or in the transmission medium. In order to ascertain the amount of distortion which telegraph apparatus may tolerate, it is desirable to generate various types and amounts of distortion under controlled conditions so that accurate analysis and adjustment of the apparatus may be made. It is usually required that the apparatus correctly function in response to signals having either marking bias, spacing bias, spacing end, or marking end distortion or any combination thereof.

Bias distortion in a signal affects the relationship between the beginning of the start pulses immediately preceding the information pulses of a telegraph character and the beginning of all subsequent marking pulses of the character. Thus, a marking bias decreases the time from the beginning of the start pulse to the beginning of any subsequent marking pulse of the information pulses, and a spacing bias increases the time from the beginning of the start pulse to the beginning of any marking information pulse in the character. The standard of comparison for determining whether a decrease or increase in the interval between the beginning of the start pulse and the beginning of any subsequent marking pulse of the character has occurred is the interval between the beginning of the start pulse and the beginning of a corresponding marking information pulse in a character having zero bias.

End distortion differs from bias distortion in that it effects a change in the relationship between the beginning of the start pulse of a character and the end of succeeding marking information pulses of the character. Marking end distortion is a condition where the normal mark to space transition of each marking pulse in a character is retarded with respect to the initiation of the start pulse. Conversely, spacing end distortion is a condition wherein the normal mark to space transition of each marking pulse in a character is advanced with respect to the initiation of the start pulse.

The mark to space transition of the stop pulse is the beginning of the start pulse which is the reference point utilized in determining the amount of bias in a telegraph signal, and this transition should not be affected by any type of distortion generated for test purposes.

It is an object of this invention to generate distorted telegraph signals with precise and easily adjustable increments of distortion therein.

Another object of this invention is to generate any desired one of the four common types of telegraph signal distortion.

It is a further object of this invention to generate distorted telegraph signals containing a predetermined type of distortion by detecting predetermined relationships between adjacent pulses of a telegraph character and utilizing this information to control the relative timing of the transitions between predetermined adjacent pulses of the character.

It is a more specific object of this invention to initially store a telegraph character to be provided with a predetermined amount and type of distortion in a shift register from which the character is shifted out of the register serially under the control of drive impulses occurring at different intervals spaced in accordance with the type and amount of distortion desired in the output signal, the drive impulse intervals being established by detecting predetermined relationships between adjacent bits of the character.

These and other objects are accomplished in a preferred embodiment of this invention which includes a shift register to which telegraph signals or characters are supplied from a tape reader or other suitable source in parallel and from which the signals are shifted out serially with the distorted output signals for the system being obtained from the last stage of the shift register. A plurality of gating circuits responsive to the signals stored in the two stages of the shift registers immediately preceding the last or output stage are provided for detecting the four different mark and space combinations which may exist in these two stages. In the gating circuits, outputs representative of these different mark and space relationships are combined with signals corresponding to the type of distortion it is desired to impart to the signals, and output signals resulting from these combinations are used to trigger selected ones of a plurality of one-shot multivibrators which operate in effect to reposition selected ones of the advance or shift pulses supplied to the shift register in accordance with the type of distortion desired. The amount of distortion imparted to the signals is varied by varying the timing period of the one-shot multivibrators.

A provision is made for automatic mixing of different types of distortion with each consecutive character having a different type of distortion. This mixing is accomplished under control of a four-stage ring counter which is driven by the reset pulses applied to the shift register at the end of each character. The output of each stage of the ring counter is utilized to apply a signal to the gating circuits corresponding to a particular type of distortion which is associated with that stage of the ring counter. It is to be noted that each stage of the ring counter corresponds to a different one of the four possible types of distortion. If desired, such a ring counter could be utilized to provide any type of mixed pattern of distortion, the only requirement being that the sequence of outputs applied to the gating circuits would control the particular type of distortion being imparted to the impulses of any given character.

Figure 3:
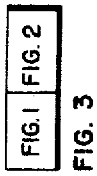
Figure 2:
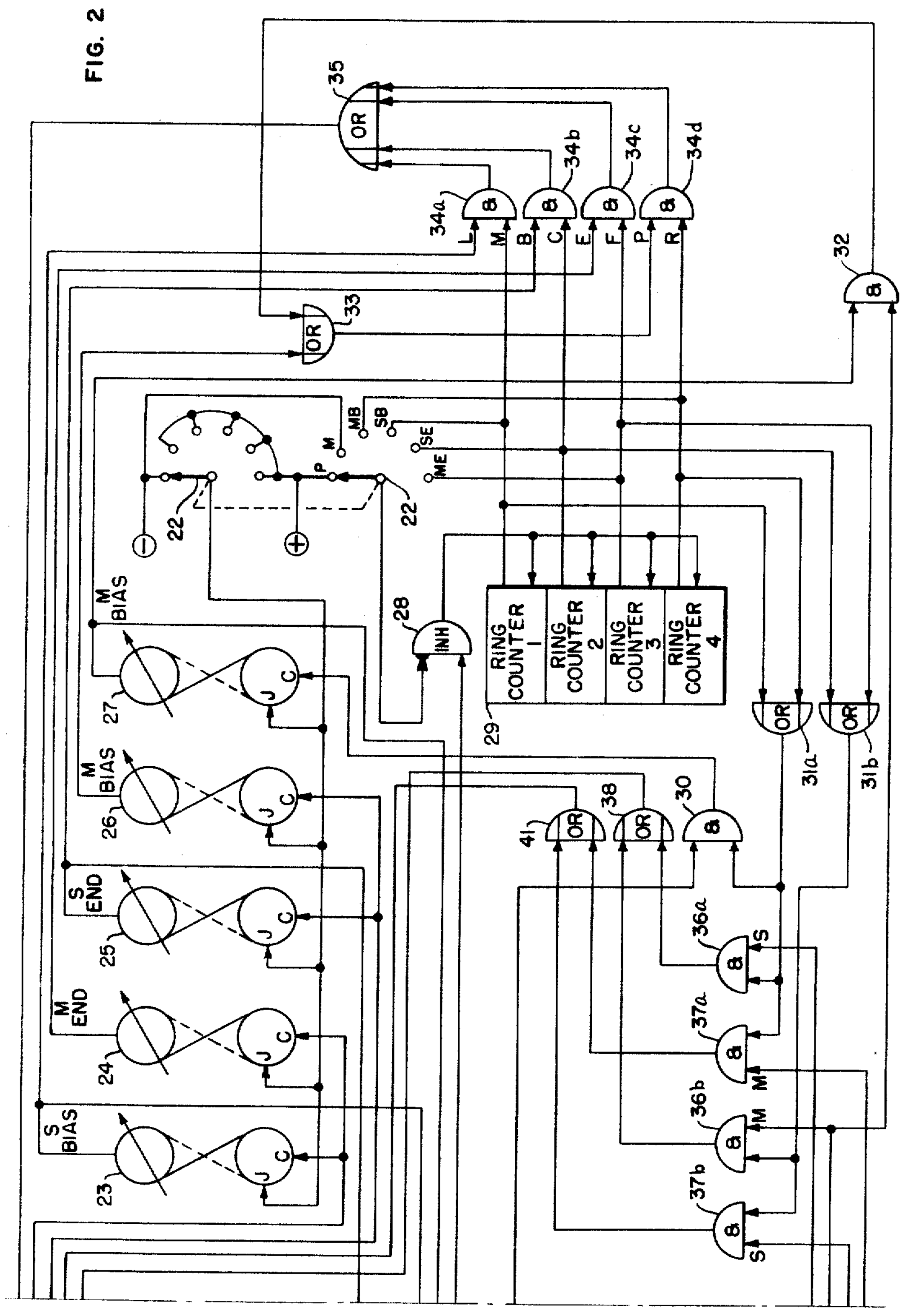
Figure 4:
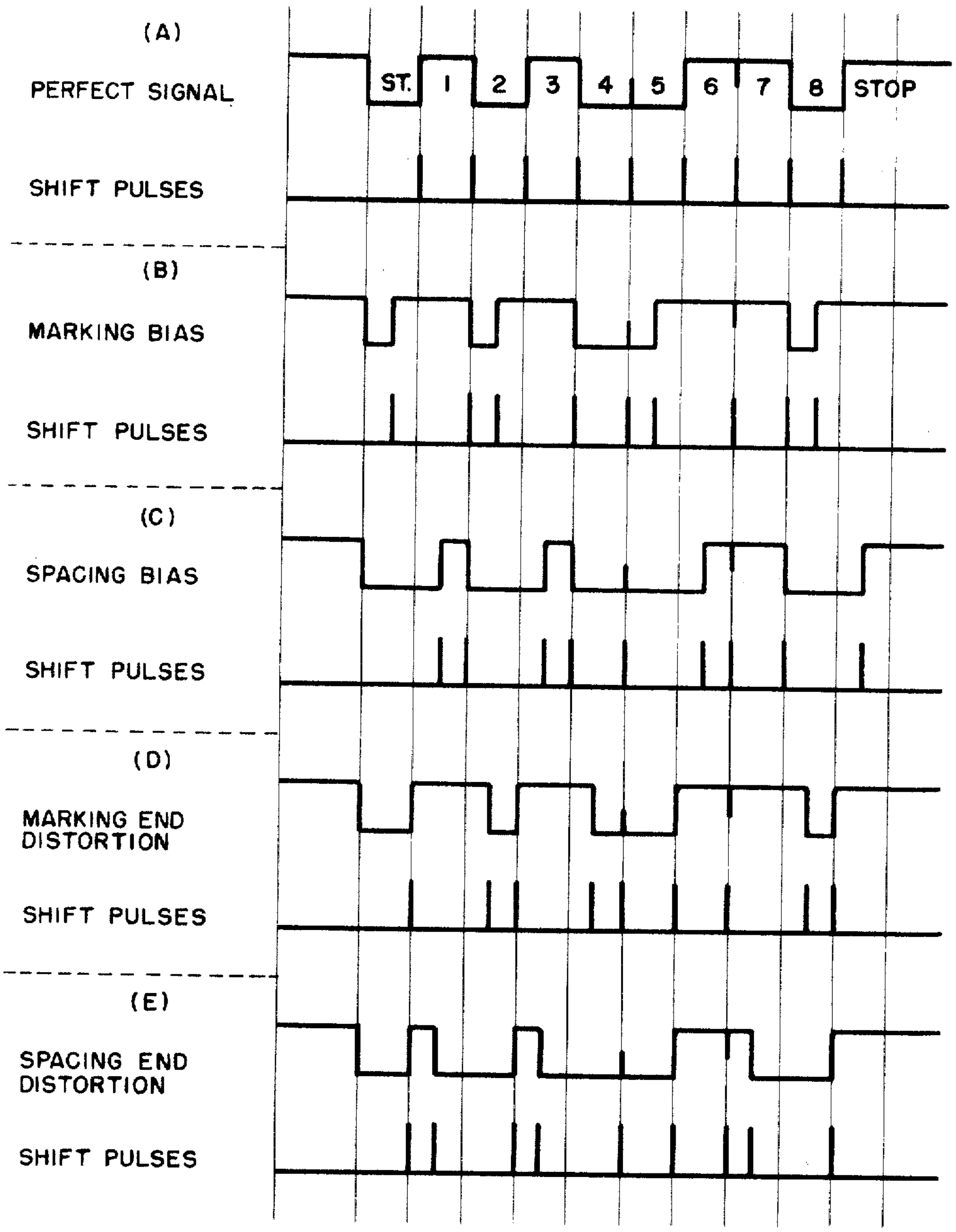

Other objects and features of this invention will become apparent to those skilled in the art upon consideration of the following detailed description taken in conjunction with the accompanying drawings in which:

FIGS. 1 and 2 assembled in the manner shown in FIG. 3 illustrate the circuit of a preferred embodiment of a distortion signal generator made in accordance with the principles of this invention; and FIG. 4 is a timing diagram showing the relationships between telegraph signals having different types of distortion introduced therein.

In the preferred embodiment of this invention shown in FIGS. 1 and 2 the telegraph signal input has been indicated as being obtained from an eight-level tape reader although other suitable parallel sources of signal inputs could be used if so desired. The individual tape reader contacts are indicated in FIG. 1 as "make" contacts designated as the first through eighth level contacts. Whenever a mark appears in a given level of the tape, the make contact associated with that level is closed; and whenever a space occurs in a given level, the contact associated with that level remains open. Each of these tape reader contacts is connected in the input path to a corresponding stage of a shift register 10 consisting of nine bistable flip-flops designated 10*a* through 10*i*, with the reader contacts for the first through eighth levels being connected to the inputs of the stages 10*b* through 10*i*, respectively. The signal output for the system is obtained from the output of stage 10*a* of the shift register.

It should be noted at this time that the flip-flops used in the shift register 10 and used elsewhere in the circuit shown in FIGS. 1 and 2 are of the type shown in detail in FIG. 1 of the copending application of F. D. Biggam No. 310,344, filed Sept. 20, 1963. The inputs to such flip-flops include a number of "And" gates so that coincidence between a priming input and a setting or trigger input is necessary in order to affect or change the state of the flip-flop. The afore-mentioned copending application should be referred to for details of operation of the flip-flops.

Associated with the tape sensing contacts of the tape reader is an auxiliary contact 11 which is closed momentarily at the beginning of each character read by the reader. When the contact 11 opens after such a momentary closure, it produces a positive pulse which after passing through a delay circuit 12 triggers a one-shot multivibrator 14 and is applied to input C of a control flip-cop 13. The flip-flop 13 is set to its "one" state by this pulse applied to its input C due to the fact that this flip-flop is permanently primed by connecting the "set one" priming input M to a source of positive potential.

When the control flip-flop 13 is set to its "one" state, a positive pulse is obtained from output L and is applied to the input D of each stage 10*a* through 10*i* of the shift register 10 in order to reset all stages of the shift register to the "zero" state. This same pulse also is applied to input E of a distortion control flip-flop 15 and causes that flip-flop to be set to its "one" state since input E is permanently primed by applying a positive potential to priming input J of the flip-flop 15. In addition, the positive pulse from output L of the control flip-flop 15 also is applied to the input of the "zero" stage of a bit ring counter 16 to cause the ring counter to be set to "zero" by rendering the "zero" element of the bit counter 16 conductive. The ring counter 16 may be of any suitable type in which the "on" element or stage primes the next succeeding element; so that upon receipt of a clock or driving pulse applied to all of the stages, the primed stage or element is turned "on" and the previously conducting stage is turned "off." In this manner a count or conductive condition is stepped sequentially through the counter. The function of the bit counter 16 will be more fully described subsequently.

Simultaneously, with the positive output pulse obtained from the output L of the control flip-flop 13, the output K of the flip-flop 13 goes from a normally positive potential to a negative potential and is applied to the priming input J of the one-shot multivibrator 14 and to the input of an oscillator control circuit 17. The application of the negative input to the priming input of the multivibrator 14 causes the multivibrator 14 to be rendered insensitive to another pulse which might occur at its input C until the control flip-flop 13 is reset to "zero" thereby driving output K from a negative to a positive potential. The oscillator control circuit 17 is utilized to control a gated oscillator 18, and the combination of the oscillator control 17 and the gated oscillator 18 may be of any suitable type such as that disclosed in Patent No. 3,036,225, issued May 22, 1962, to G. A. Kladde. So long as positive potential is applied from output K of the control flip-flop 13 to the oscillator control circuit 17, the timing capacitor of the oscillator 18 is prevented from attaining a potential sufficient to trigger the oscillator. However, as soon as the negative potential obtained from output K of the control flip-flop 13 is applied to the input of the oscillator control circuit 17, the control circuit allows the timing capacitor of the gated oscillator 18 to begin charging toward a potential which will trigger the oscillator for its first output pulse. The time chosen for this to occur is adjusted to be equal to one unit bit length in the desired output signal. So long as the negative potential present on output K of the control flip-flop 13 is applied to the oscillator control circuit 17, the gated oscillator 18 is free running and is adjusted to provide positive clock pulses at unit bit length intervals. These clock pulses will continue until the control flip-flop 13 is driven to its "zero" state causing a positive potential to be applied from output K of the control flip-flop to the input of the oscillator control circuit 17, at which time the gated oscillator 18 once again is rendered inoperative by the oscillator control circuit 17.

During the time that the gated oscillator 18 is timing out prior to causing the first output pulse to be obtained therefrom, the one-shot multivibrator 14 times out and causes a positive output pulse to be obtained from output L. This pulse is supplied to each of the tape sensing contacts, so that any contacts which are closed designating a mark in a particular level pass this pulse to input C of the corresponding flip-flop of shift register 10. As a result, the stages of the shift register associated with a closed tape sensing contact are set to store a mark condition since input C is permanently primed by the application of a ground potential to priming input M associated with input C. Obviously, any stage of the shift register associated with a tape sensing contact which is open, designating a space in that level of the tape, will remain set to the space condition to which it was set upon receipt of the register reset pulse from output L of the control flip-flop 13 which was applied to input D of the shift register flip-flops as previously described.

It should be noted at this time that stage 10*a* of the shift register 10 now is storing the space condition to which it was set when the shift register was reset. This space condition in stage 10*a* constitutes the start element of a start-stop telegraph permutation signal and its duration is controlled by the time required for the gated oscillator 18 to provide its first output pulse following the setting of the control flip-flop 13.

Control of the system from this point on is under he control of the gated oscillator 18, and the output clock pulses from the oscillator 18 are applied to the stepping inputs of the bit counter 16 to cause the bit counter to advance the conductive stage in synchronism with the oscillator output. For example, the first output pulse of the oscillator 18 advances the count in the bit counter 16 from the "zero" stage to which it was reset, as previously stated, to the "one" stage, the second output pulse obtained from the oscillator 18 advances the counter from the "one" to the "two" stage, etc. The output pulses obtained from the gated oscillator 18 also are applied to a pair of inhibit gates 19 and 20. The inhibit gates in turn are controlled by the distortion control flip-flop 15 which is set to its "one" state at the beginning of each character causing the inhibit gate 20 to be open and the inhibit gate 19 to be closed; so that in the absence of any desired distortion, the first pulse from the gating oscillator 18 is passed by the inhibit gate 20 through an "or" gate 21 and is applied symmetrically to all stages of the shift register 10 to advance the information stored in the shift register one step from letf to right. Thus, the signal now stored in the stage 10*a* and therefore supplied to the signal output is the information originally contained in the first level of the tape and stored in stage 10*b*. In a like manner, all of the other stages of the shift register 10 are now storing the information originally stored in the next higher level. The manner in which this advance or shifting of the information is accomplished is fully described in the copending application of S. Silberg Ser. No. 166,286, filed Jan. 15, 1962.

Stage 10*i* of the shift register 10 is permanently primed to store a mark by the application of a positive potential to the mark priming gate J and by the application of a negative potential to the space priming gate H. As a consequence, the application of the shift pulse to inputs E and F of the flip-flop in stage 10*i* causes that flip-flop to be set to a mark condition each time a shift pulse is received. As a consequence, it can be seen that when all of the information is shifted out of the shift register, all of the stages of the shift register will store a mark condition, including the output stage 10*a* of the shift register. This final mark condition obtained from the output of stage 10*a* constitutes the stop pulse of a start-stop telegraph signal.

When no distortion is to be imparted to the signal, the distortion control flip-flop remains set to its "one" state and all of the pulses obtained from the gated oscillator 18 are passed by the inhibit gate 20 and blocked by the inhibit gate 19; so that the control of the shift register 10 is obtained exclusively from the gated oscillator 18. Thus, each element of the undistorted signal output is of equal duration and the transitions in the output signal occur at equally spaced intervals determined by the frequency of the output pulses obtained from the gating oscillator 18.

When the ninth pulse is obtained from the gated oscillator 18, stage 9 of the bit counter 16 is rendered conductive causing a positive output pulse to be applied to input D of control flip-flops 13. This pulse resets the control flip-flop to "zero" thereupon causing a positive potential to be applied to the oscillator control circuit 17 which inhibits further operation of the gated oscillator 18 as previously described. At the same time, the priming potential is restored to input J of the one-shot multivibrator 14. The receipt of the ninth shift pulse applied to inputs E and F of the shift register causes a mark to be stored in stage 10*a* of the shift register and this mark constitutes the stop element of the transmitted character obtained from the signal output as stated previously. If it is desired to continue the transmission of undistorted signals from the system, the above cycle is repeated upon the operation of the auxiliary contact 11 for the next character to be read from the tape.

In addition to supplying undistorted signals, however, the system is capable of generating four types of distorted telegraph signals, these types being marking bias, spacing bias, marking end, and spacing end distortion. As stated previously, bias distortion, either marking or spacing, refers to distortion which takes place on the leading edge of a marking information pulse in a character. End distortion, either marking or spacing, refers to distortion which takes place on the trailing edge of marking input pulses. By the proper positioning of selected ones of the shift pulses applied to the shift register 10, any of the four types of distortion may be introduced into the output of the shift register obtained from stage 10*a*. Control of the particular type of distortion which is being imparted to the telegraph signal by the system of this invention is established by the setting of a distortion control switch 22 (FIG. 2).

In the previous discussion which assumed generation of a perfect or undistorted signal, control switch 22 was set to the position P as illustrated in the drawing. In this position a negative potential is applied to each of the priming gates J of a plurality of multivibrators 23 to 27 to prevent these multivibrators from being triggered into operation. At the same time, a positive potential is applied through switch 22, position P, to an inhibit gate 28 to close or block the inhibit gate 28, the other input to which is obtained from the output K of the control flip-flop 13 when it is reset to "zero." As a consequence, during the generation of normal or undistorted signals, the distortion control circuit is rendered inoperative; and a perfect signal, as shown in FIG. 4, is obtained from the signal output L of stage 10*a* of the shift register 10 under control of the periodic shift pulses generated by the gated oscillator 18.

Assume now that it is desired to impart marking bias to the telegraph signal generated by this system. The distortion control switch 22 then is set to position MB causing a positive priming potential to be applied to priming gates J of the one-shot multivibrators 23 to 27 and further causing the inhibit signal previously applied to the inhibit gate 28 to be removed. When this occurs, a ring counter 29 is stepped each time the control flip-flop 13 is reset to "zero" causing a positive pulse at output K. These pulses are passed by the inhibit gate 28 until the ring counter 29 reaches step 4. At this time, a positive output is obtained from step 4 of the counter and is applied through position MB of the distortion control switch 22 to the inhibit gate 28 to block the passage of any further pulses by the inhibit gate 28. The next reset pulse applied to the shift register 10 then is applied to an "And" gate 30, the other input to which is primed by the output of step 4 of the ring counter 29 through an "Or" gate 31*a*. As a consequence, this register reset pulse is passed by the "And" gate 30 and is applied to input C of a marking bias one-shot multivibrator 27 to trigger the multivibrator 27 since it previously has been primed by the application of the positive potential applied to priming input J through the distortion control switch 22. The marking bias multivibrator 27 is chosen to time out in an interval which is less than the period of the gated oscillator 18, and an output pulse obtained from the output of the multivibrator 27 when it times out is applied to an "And" gate 32. The timing period of the marking bias multivibrator 27 is variable and is set to impart the desired degree or percentage of distortion to the signal. However, this timing period obviously must be shorter than a cycle of oscillation of gated oscillator 18.

Assume for the purposes of illustration that the character stored in the shift register 10 is that represented by the perfect signal shown in waveform A of FIG. 4, that is, with levels 1, 3, 6 and 7 marking, and levels 2, 4, 5 and 8 spacing. The mark in the first level is stored in stage 10*b* of the shift register and causes a positive output to be obtained from output L of stage 10*b*. This positive output is applied to priming input H of the distortion control flip-flop 15 and also is applied as a priming potential to "And" gate 32. At the end of the timing cycle of the marking bias multivibrator 27, a positive output pulse is applied to the other input of the "And" gate 32 and is passed by this "And" gate and an "Or" gate 33 from which it is applied to the input of another "And" gate 34*d*. The "And" gate 34*d* is primed to pass this pulse by the output of step 4 of the ring counter 29. The pulse from the output of the "And" gate 34*d* then is passed by "Or" gates 35 and 21 which apply it to the shift register 10 as the first shift pulse for the character. It is to be noted from FIG. 4 that this advance pulse effectively shortens the length of the start element for marking bias.

At the same time that the output of the marking bias multivibrator 27 causes the information in the shift register to be advanced, the output of the multivibrator 27 also is applied to input F of the distortion control flip-flop 15 to set the flip-flop to "zero" since a priming potential was applied to priming input H from the mark output of stage 10*b* of the shift register. As a result of this action, inhibit gate 19 is opened and inhibit gate 20 is closed. This prevents the first output pulse of the gated oscillator 18 from being supplied through the gates 20 and 21 to the shift registers as would be the case for normal distortion free operation. This first pulse from the gated oscillator 18, however, is passed by the now open inhibit gate 19 and triggers the variable one-shot multivibrator 23 since that multivibrator is primed from the positive source of potential through switch 22 at priming injut J. The one-shot multivibrator 23 is adjusted to time out in a period less than the period between the clock pulse obtained from the gated oscillator 18, and at time out, applies a positive pulse to input C of the distortion control flip-flop 15, which is permanently primed at priming input M, to reset the flip-flop 15 to its "one" state. The second clock pulse obtained from the gated oscillator 18 then is passed by the inhibit gate 20 since this gate has been reopened by the resetting of the flip-flop 15, and this second clock pulse becomes the second advance pulse for the register as may be readily ascertained from an examination of FIG. 4.

The mark bit originally stored in stage 10*d* of the register was shifted to stage 10*c* and the space bit originally stored in stage 10*c* was shifted to stage 10*b* by the first advance pulse applied to the register. A pair of "And" gates 36*a* and 37*a* are primed by the output of "Or" gate 31*a*; and when a space is stored in register 10*b*, an output is obtained from the "And" gate 36*a* and is passed by an "Or" gate 38 through a delay circuit 39 to prime an "And" gate 40. In a like manner, when a mark is stored in stage 10*c* of the register, an output is obtained from the primed "And" gate 37*a* and is passed by an "Or" gate 41 and a delay circuit 42 to prime the "And" gate 40. The delay in these signals caused by the delay circuits 39 and 42 is of relatively short duration so that an output is obtained from these delay circuits prior to the occurrence of the second clock pulse from the oscillator 18. As a consequence, the second clock pulse which is passed by the inhibit gate 20 also is passed by the primed "And" gate 40 and is utilized to trigger the one-shot multivibrator 25 which times out in a period less than the period of the clock pulses of the gating oscillator 18.

When the one-shot multivibrator 25 times out, a positive pulse is applied to input D of the distortion control flip-flop 15 to set the flip-flop to its "zero" state. As stated previously, this causes the inhibit gate 20 to block subsequent clock pulses from the gated oscillator 18 and causes the inhibit gate 19 to pass any subsequent clock pulses from the gated oscillator 18.

At the same time that the multivibrator 25 is triggered by the output of the "And" gate 40, the marking bias multivibrator 26 also is triggered. When the marking bias multivibrator 26 times out, an output pulse is passed through the "Or" gate 33, the primed "And" gate 34*d*, the "Or" gate 35 and the "Or" gate 21 in the same manner as the first shift pulse which was obtained from the marking bias multivibrator 27, and is applied to the shift register 10 as the third shift pulse for the register. Thus, it is seen that the space to mark transition for the third element of the signal has been advanced in a manner similar to the advance of this transition for the first element of the signal (see FIG. 4, waveform B).

The third clock pulse obtained from the gated oscillator 18 is blocked by the inhibit gate 20 and passed by the inhibit gate 19 to trigger the multivibrator 23. When the multivibrator 23 times out, a positive pulse is applied to input C of the distortion control flip-flop 15 to reset the flip-flop 15 to the "one" state in the manner previously described. As a consequence of the resetting of the flip-flop 15, the fourth clock pulse generated by the oscillator 18 is blocked by the inhibit gate 19 but is passed by the inhibit gate 20 to become the fourth shift pulse for the shift register. Since the fourth and fifth levels of the character stored in the shift register both were spacing and were stored in stages 10*b* and 10*c* at the time of this fourth pulse, no output from the "And" gate 40 is obtained at this time. As a consequence, the fifth clock pulse generated by the gated oscillator 18 also is passed by the inhibit gate 20 to become the fifth advance pulse for the shift register.

The fifth and sixth levels of the character originally stored in the shift register were space and mark, respectively. When the information contained in these levels is shifted to the stages 10*b* and 10*c*, respectively, of the shift register by the fourth shift pulse, output signals are obtained from the "And" gates 36*a* and 37*a* in the manner previously described to prime the "And" gate 40 which then passes the fifth clock pulse generated by the gated oscillator 18. The output of the "And" gate 40 then triggers the multivibrator 25 and the marking bias multivibrator 26. As stated previously, the output of the multivibrator 25 sets the distortion control flip-flop 15 to its "zero" state; and the output of the marking bias multivibrator 26 is applied to the shift register as the sixth shift pulse over a path previously described. Shortly after this happens, the sixth clock pulse from the gated oscillator 18 is blocked by the inhibit gate 20 and is passed by the inhibit gate 19 and triggers the multivibrator 23, the output of which is utilized to reset the distortion control flip-flop 15 to its "one" state.

Due to the fact that the seventh and eighth levels of the original stored character are mark and space, respectively, the "And" gate 40 is not primed at the time of the seventh clock pulse from the oscillator 18 and, as a consequence, blocks the seventh clock pulse which is passed by the inhibit gate 20. The seventh clock pulse generated by the gated oscillator 18 passes through the inhibit gate 20 since the flip-flop 15 is set to its "one" state, and this seventh clock pulse constitutes the seventh shift pulse for the shift register.

Since this seventh clock pulse was not passed by the "And" gate 40, the eighth clock pulse generated by the oscillator 18 also is passed by the inhibit gate 20 and is applied to the shift register as the eighth shift pulse for the register. At the same time, the eighth clock pulse is passed by the "And" gate 40 since the eighth level of the original character stored in the shift register in space followed by the mark inserted due to the permanent marking prime on stage 10*i* of the register. Thus, when these conditions are stored in stages 10*b* and 10*c*, respectively, following the seventh shift pulse, outputs are obtained from "And" gates 36*a* and 37*a* as previously described to cause a delay output to appear from each of the delay circuits 39 and 42 to prime the "And" gate 40. As a consequence, the output of the "And" gate 40 is utilized to trigger multivibrator 25 and the marking bias multivibrator 27 which reset the distortion control flip-flop 15 to its "zero" state and cause the ninth shift pulse for the register 10 to be obtained from the output of the marking bias multivibrator 26 in the manner previously described. Shortly thereafter, the ninth clock pulse is obtained from the gated oscillator 18; but this clock pulse is blocked by the inhibit gate 20 and is passed by the inhibit gate 19 to trigger the multivibrator 23, the output of which resets the flip-flop 15 to its "one" state.

As described previously, the clock pulses obtained from the gated oscillator 18 also drive the bit counter 16; and when the ninth clock pulse is supplied to the bit counter 16, an output is obtained from stage 9 of the counter which is applied to input D of the control flip-flop 13 to reset the flip-flop 13 to its "zero" state. This causes the gated oscillator 18 to be turned off or rendered inoperative as previously described. Upon momentary closure of the auxiliary contact 11 for the next character, the above cycle is repeated for the next character.

It should be noted that the pulses obtained from the outputs of the "And" gates 36*a* and 37*a* which are passed by the "Or" gates 38 and 41 are delayed in the delay circuits 39 and 42 prior to their application as priming inputs to the "And" gate 40. This is necessary in order that the "And" gate 40 correctly senses the condition of the information temporarily stored in stages 10*b* and 10*c* of the shift register. As described previously in conjunction with the operation of the system for imparting marking bias to the signal, when the "And" gate 40 receives a clock pulse from the output of the inhibit gate 20, it either blocks the passage of this pulse or allows its passage depending upon the conditions stored in stages 10*b* and 10*c* of the register. The leading edge of the clock pulse passed by the inhibit gate 20 shifts the information in the register in approximately one microsecond, and the clock pulse is approximately four microseconds long. Without the delay imparted by circuits 39 and 42, the leading edge of a shift pulse could shift information into stages 10b and 10c of the shift register that would cause output signals to be obtained from the "And" gates 36a and 37a or 36b and 37b which should be utilized to control the next subsequent clock pulse, but which would be applied to the priming inputs of the "And" gate 40 during the remaining three microseconds of the clock pulse allowing a signal to pass through the "And" gate 40. This would create an error. For this reason the delay circuits 39 and 42 provide approximately a 100 microsecond delay to the outputs of the "Or" gates 38 and 41 so that such erroneous operation cannot take place.

Now assume that it is desired to impart spacing bias to the signal. A signal train with spacing bias imparting to it along with the shift pulses necessary to impart such spacing bias to the signal is shown in waveform C in FIG. 4. Assume once again for the purpose of illustration that the signal shown in waveform A of FIG. 4 is initially stored in the shift register and is the signal to which it is desired to impart spacing bias. Thus, levels 1, 3, 6 and 7 are marking and levels 2, 4, 5 and 8 are spacing.

When spacing bias is to be applied to the signal, the distortion selector switch 22 is moved to position SB. In this position all of the multivibrators 23 to 27 are primed as in the case discussed previously for marking bias; and if the ring counter 29 is not already set to the step corresponding to spacing bias, the inhibit signal is removed from the inhibit gate 28. The pulses from output K of the flip-flop 13 when it is reset to "zero" at the end of each character then are passed by the inhibit gate 28 as previously discussed until the ring counter 29 reaches step 1, at which time an inhibit signal is applied from step 1 of the ring counter through position SB of the switch 22 to the inhibit gate 28 to inhibit further passage of the pulses. The output of step 1 of the ring counter also primes an "And" gate 34a for purposes to be explained subsequently. In a like manner the output of step 1 of the ring counter is applied through the "Or" gate 31a to prime the "And" gates 30, 36a and 37a in the same manner as was accomplished by step 4 of the ring counter in conjunction with marking bias distortion.

The first register reset pulse to occur after the ring counter 29 steps to step 1 is passed by the "And" gate 30 and triggers the multivibrator 27 in the manner previously described. The output of the multivibrator 27 sets the distortion control flip-flop 15 to its "zero" state at input F since this input is primed at H by the mark output from stage 10b of the shift register. If a space were stored in stage 10b at this time, the pulse applied to input F of the flip-flop 15 would have no effect since no priming signal would be present at priming input H. Although the output of the multivibrator 27 also is applied through the "Or" gate 33 to the "And" gate 34d, it is not passed by the "And" gate 34d since this gate is not primed due to the fact that only step 1 of the ring counter which primes the gate 34a provides a priming output at this time.

As stated previously, the multivibrator 27 times out in a period less than the period of the clock pulses provided by the gated oscillator 18. As a consequence, the first clock pulse provided by the gated oscillator 18 is blocked by the inhibit gate 20; so that it is not applied as a shift pulse to the shift register 10. Consequently, the length of the start pulse is extended as may be ascertained by reference to waveform C of FIG. 4. This first clock pulse is passed by the inhibit gate 19, however, and triggers the spacing bias multivibrator 23 which times out in less than the period of the clock pulses generated by the oscillator 18 and resets the distortion control flip-flop 15 to its "one" state in the same manner previously described. The output pulse from the spacing bias multivibrator 23 also is passed by the "And" gate 34a since the gate is primed by step 1 of the ring counter 29. The pulse produced at the output of the "And" gate 34a passes through the "Or" gate 35 and the "Or" gate 21 from which it is applied to the shift register 10 as the first shift pulse for the register.

The second clock pulse produced by oscillator 18 then is blocked by the inhibit gate 19 but passes through the inhibit gate 20 and the "Or" gate 21 to become the second advance pulse for the shift register. Since the first advance pulse shifted the character originally stored in the register one step to the right, outputs were produced from the "And" gates 36a and 37a after the first shift pulse in the same manner previously discussed in the description of the operation of the circuit for imparting marking bias to the siganl. The output signals from these "And" gates after being passed by the "Or" gates 38 and 41 and delayed by the delay circuits 39 and 42 primed the "And" gate 40 prior to the second clock pulse generated by the oscillator 18.

As a consequence, when this second clock pulse is passed by the inhibit gate 20, it also is passed by the "And" gate 40 to trigger the one-shot multivibrator 25. The multivibrator 25 times out in an interval less than the period of the clock pulses and resets the distortion control flip-flop 15 to "zero" in a manner previously described. Thus, the next clock pulse generated by the oscillator 18 is blocked by the inhibit gate 20 and passes through inhibit gate 19 to once again trigger spacing bias multivibrator 23. The output of the multivibrator 23, when it times out, becomes the third shift pulse for the shift register 10 and resets the distortion flip-flop 15 to its "one" state.

The fourth clock pulse produced by the gated oscillator 18 then becomes the fourth shift pulse for the shift register 10. Since levels 4 and 5 of the stored character both are spacing, the fourth clock pulse is not passed by the "And" gate 40 since no output was obtained from the "And" gate 37a removing one of the priming signals from the "And" gate 40. As a consequence, the fifth clock pulse generated by the oscillator 18 also is passed by the inhibit gate 20 to become the fifth shift pulse for the register 10.

Since levels 5 and 6 of the stored character are space and mark, respectively, this fifth clock pulse also is passed by the "And" gate 40 to trigger the multivibrator 25 which resets the distortion control flip-flop 15 to "zero" in the manner previously described. This causes the sixth clock pulse generated by the gated oscillator 18 to be blocked by the inhibit gate 20 and to be passed by the inhibit gate 19 to trigger the spacing bias multivibrator 23 which produces the sixth shift pulse for the shift register and resets the distortion control flip-flop 15 to its "one" state. The seventh clock pulse from the gated oscillator 18 then becomes the seventh shift pulse; and since levels 7 and 8 of the character are mark and space, respectively, this pulse is not passed by the "And" gate 40 thereby causing the eighth clock pulse to become the eighth shift pulse for the shift register. Due to the fact that level 8 of the character and the stop element stored in stages 10b and 10c after the seventh shift pulse are space and mark, respectively, the eighth clock pulse is passed by the "And" gate 40 to trigger the multivibrator 25 causing the distortion control flip-flop 15 to be set to its "zero" state. As a consequence the ninth clock pulse generated by the oscillator 18 is passed by the inhibit gate 19 to trigger the spacing bias multivibrator 23 the output of which becomes the ninth shift pulse for the shift register.

The ninth clock pulse causes the control flip-flop 13 to be reset in the manner previously described to prepare the system for the receipt of the next character. Upon closure of the auxiliary contact 11, the above cycle of operation is completed with the exception that it is not necessary to step the ring counter 29 since it already is stepped to step 1 representing spacing bias.

In order to impart end distortion to the telegraph characters temporarily stored in the shift register 10, all of the shift pulses applied to the shift register that will shift a spacing bit into stage 10*a* of the register when this stage previously was in a marking condition are repositioned. With a marking bit stored in stage 10*b* and a spacing bit stored in stage 10*c*, inputs are applied to both "And" gates 36*b* and 37*b* which are primed for marking end distortion and spacing end distortion by the output of step 2 or 3 of the ring counter 29. As a consequence, the next clock pulse which shifts the marking bit from stage 10*b* to to stage 10*a* and the spacing bit from stage 10*c* to stage 10*b* also is passed by the "And" gate 40 in a manner to be described to trigger circuitry which repositions the next shift pulse.

Assume now that it is desired to impart marking end distortion to the signal. Once again for the purpose of illustration assume that the character supplied to the shift register 10 is that shown in waveform A of FIG. 4. In conjunction with the following description refere to waveform D of FIG. 4 which shows this same character with marking end distortion imparted to it.

With the distortion control switch 22 set to position ME the pulses from output K of the flip-flop 13 when it is reset to "zero" are passed by the inhibit gate 28 until the ring counter is stepped to step 3 at which time the inhibit gate 28 blocks the passage of further reset pulses in the manner previously described. The output of step 3 of the counter 29 primes the "And" gate 34*c* with "And" gates 34*a*, 34*b* and 34*d* being unprimed or blocked and also primes the "And" gates 36*b* and 37*b* through an "Or" gate 31*b*.

Since no output is obtained from the "Or" gate 31*a* when the ring counter 29 is in step 3, the first reset pulse following the setting of the ring counter to step 3 is not passed by the "And" gate 30; so that the multivibrator 27 is not triggered when marking end distortion is desired. As a consequence, the first clock pulse produced by the gated oscillator 18 is blocked by the inhibit gate 19 and is passed by the inhibit gate 20 to become the first shift pulse for the shift register 10 since the distortion control flip-flop 15 is set to "one" by the register reset pulse preceding the first clock pulse. This first clock pulse also passes through the "And" gate 40 since stages 10*b* and 10*c* of the shift register originally stored a mark and space, respectively. The outputs from these stages produced outputs from the "And" gates 36*b* and 37*b* which were primed, as previously described, by the output of the "Or" gate 31*b*. The outputs of the "And" gates 36*b* and 37*b* were passed by the "Or" gates 38 and 41 and were delayed by the delay circuits 39 and 42 from which they were applied to the "And" gate 40 as priming potentials prior to the generation of the first clock pulse.

Thus, the first clock pulse passed by the inhibit gate 20 also is passed by the "And" gate 40 to trigger the multivibrator 25, the output of which resets the distortion control flip-flop 15 to "zero" prior to the second clock pulse from oscillator 18.

The second clock pulse from the oscillator 18 then is blocked by the inhibit gate 20 and is passed by the inhibit gate 19 to trigger the one-shot multivibrator 23 and the marking end one-shot multivibrator 24. The output of the multivibrator 23 resets the distortion control flip-flop 15 to its "one" state as previously described, and the output of the marking end multivibrator 24 is passed by the "And" gate 34*c* and "Or" gates 35 and 21 to become the second shift pulse for the shift register 10 thereby lengthening the first marking bit obtained from the output of stage 10*a* of the shift register. The third clock pulse from the oscillator 18 is passed by the inhibit gate 20 to become the third shift pulse for the shift register. This pulse also is passed by the "And" gate 40 since levels 3 and 4 of the character are marking and spacing, respectively, and were stored in stages 10*b* and 10*c* of the register, respectively, prior to this third clock pulse, causing both priming inputs to the "And" gate 40 to be energized. The output of the "And" gate 40 triggers the multivibrator 25, the output of which sets the distortion control flip-flop 15 to "zero." The fourth clock pulse then is blocked by the inhibit gate 20 but is passed by the inhibit gate 19 to trigger the multivibrator 23 and the marking end multivibrator 24 in the manner previously described. The output of the multivibrator 23 resets the flip-flop 15 to its "one" state, and the output pulse of the marking end multivibrator 24 becomes the fourth shift pulse for the shift register.

The fifth clock pulse from the oscillator 18 is passed by the inhibit gate 20 to become the fifth shift pulse. Since levels 5 and 6 of the character are spacing and marking, respectively, the "And" gate 40 is not primed at this time; so that the sixth clock pulse from the oscillator 18 becomes the sixth shift pulse for the register 10. In a like manner since levels 6 and 7 of the character both are marking, no output is obtained from the "And" gate 37*b*; so that the seventh clock pulse also is the seventh shift pulse and is passed by the inhibit gate 20.

This seventh clock pulse, however, also is passed by the "And" gate 40 since the levels 7 and 8 of the character are stored in stages 10*b* and 10*c* of the register at the time of occurrence of the seventh clock pulse and cause outputs to be obtained from both "And" gates 36*b* and 37*b*. In a manner previously described, the output of the "And" gate 40 causes the multivibrator 25 to reset the flip-flop 15 to its "zero" state; so that the eighth clock pulse from the oscillator 18 is inhibited by the gate 20 but is passed by the gate 19 to trigger the marking end multivibrator 24 which provides the eighth shift pulse for the shift register 10. Likewise in a manner previously described, the multivibrator 23 is triggered by the eighth clock pulse and resets the flip-flop 15 to its "one" state allowing the ninth and final clock pulse from the gated oscillator 18 to be passed by the inhibit gate 20 to constitute the ninth shift pulse applied to the shift register 10.

In order to impart spacing end distortion to the characters obtained from the output of stage 10*a* of the shift register 10, the distortion control switch 22 is set to position SE. This causes the ring counter 29 to be advanced to step 2 by pulses from output K of the flip-flop 13 when it is reset to "zero"; and the sequence of operation for the system is similar to that described previously with respect to marking end distortion. Whenever a mark is stored in stage 10*b* of the shift register and a space is stored in stage 10*c* of the shift register outputs are obtained from the "And" gates 36*b* and 37*b* which after delay by delay circuits 39 and 42 prime the "And" gate 40 to pass the next clock pulse from the gated oscillator 18. The output of the "And" gate 40 then triggers the spacing end multivibrator 25 which resets the distortion control flip-flop 15 to its "zero" state to prevent the next clock pulse from the dated oscillator 18 from being applied as a shift pulse to the shift register. At the same time, the output of the spacing end multivibrator 25 also is passed through the "And" gate 34*b*, which is primed by step 2 of the ring counter 29, to become the next shift pulse for the shift register. The advance pulses obtained from the spacing end multivibrator 25 considerably shorten the length of the marking bits of the character by causing a mark to space transition to occur early in the interval normally occupied by a mark impulse. The next clock pulse to be obtained from the gated oscillator 18 following a shift pulse supplied by the spacing end multivibrator 25 is applied to the multivibrator 23, the output of which resets the distortion control flip-flop 15 to its "one" state thereby allowing the next subsequent clock pulse from the oscillator 18 to be passed by the inhibit gate 20 as a shift pulse for the shift register 10. In all other respects the operation of the system for generation of spacing end distortion in a signal is the same as the operation previously described for the generation of marking end distortion.

A further position is provided on the distortion control switch 22 for allowing "mixed" distortion to be imparted to signals supplied to the shift register 10. When distortion control switch 22 is set to position M, the multivibrators 23 to 27 are permanently primed; and a negative potential is applied to the inhibit input of the inhibit gate 28 to cause that gate to remain permanently open so that each pulse from ouput K of the flip-flop 13 when it is reset to "zero" is passed by the inhibit gate 28 to step the ring counter 29 one step. The character following the next register reset pulse will have the type of distortion imparted to it which corresponds to the particular step to which the ring counter 29 has been advanced, that is, if the ring counter 29 is in step 2, spacing end distortion will be applied to that character, if the ring counter 29 is in step 4, marking bias distortion will be imparted to that character, etc. The next reset to "zero" of the flip-flop 13 will advance the ring counter 29 one step, so that the next character will have a different type of distortion imparted to it. With the ring counter 29 connected to the gates 34*a* to 34*d* as shown in FIG. 2, the sequence which will be obtained with such mixed distortion will proceed from spacing bias to spacing end to marking end to marking bias with this cycle continuously repeating so long as the distortion control switch 22 is set to position M. It should be noted that the sequence or cycle of such mixed distortion may be varied to cause any desired mixture or sequence to occur. If no provision for mixed distortion is desired, the ring counter 29 and its associated circuitry may be replaced by a multiple position switch operated in conjunction with the switch 22 to provide the proper priming potentials applied to the "And" gates 34*a* to 34*d* and to the "Or" gates 31*a* and 31*b*. Such a modification of the disclosed circuit will be obvious to those skilled in the art.

It also should be noted that the amount or percentage of distortion imparted to the signals may be varied by varying the timing period of the one-shot multivibrators 23 to 27. The particular character shown in FIG. 4 and used to illustrate the principles of this invention is arbitrary and was utilized only to facilitate the description of the operation of the system. The circuit of this invention will function with any permutation of mark and space signals and is not limited to the particular character illustrated.

Alothough this invention has been described with reference to a particular preferred embodiment it will be apparent to those skilled in the art that various modifications and changes may be made without departing from the spirit and scope of the invention. For example, it is obvious that the practice of this invention is not limited to use with permutation code characters having eight levels only, but that the number of levels of the signal may be any suitable number entailing merely the addition or subtraction of stages in the shift register 10 and the bit counter 16. Also it is apparent that other types of pulse delay means may be substituted for the one-shot multivibrators 23 to 27 is so desired.

What is claimed is:

1. A distortion signal generator comprising
means for temporarily storing a signal to be distorted,
means for generating a series of pulses,
means for applying the pulses to the storage means to remove the signal from the storage means in synchronism with the applied pulses,
means for sensing predetermined conditions in the signal, and
means responsive to the output of the sensing means for repositioning selected ones of the pulses applied to the storage means to introduce a predetermined distortion in the signal.

2. A signal generator for introducing distortion into a signal including
means for temporarily storing the signal,
means for generating a series of pulses,
means for applying the pulses to the storage means to transfer the signals from the storage means to an output line in synchronism with the applied pulses,
means for sensing predetermined relationships between adjacent portions of the signal, and
means responsive to the output of the sensing means for repositioning selected ones of the pulses applied to the storage means to introduce a predetermined amount and type of distortion to the signal on the output line.

3. A signal generator for introducing distortion into a signal consisting of a plurality of binary pulses comprising
means for temporarily storing the signal,
means for generating a series of pulses at periodic intervals,
means for applying the generated pulses to the storage means to transfer the signal pulses from the storage means to an output line in synchronism with the applied pulses,
means for sensing predetermined relationships between adjacent pulses of the signal, and
means responsive to the output of the sensing means for repositioning selected ones of the pulses applied to the storage means to change the interval between predetermined successive applied pulses causing a predetermined amount and type of distortion to be introduced to the signal on the output line.

4. A signal generator for introducing distortion into a signal consisting of a plurality of binary pulses comprising
means for temporarily storing the signal,
means for generating a series of pulses at periodic intervals,
means for applying the generated pulses to the storage means to cause the signal pulses to be transferred from the storage means to an output line in synchronism with the applied pulses,
means for sensing predetermined relationships between adjacent pulses of the signal stored in predetermined positions of the storage means, and
means responsive to the output of the sensing means for repositioning selected ones of the pulses applied to the storage means to change the interval between successive applied pulses to introduce a predetermined amount and type of distortion to the signal on the output line.

5. A signal generator according to claim 4 wherein the repositioning means advances selected ones of the pulses applied to the storage means.

6. A signal generator according to claim 4 wherein the repositioning means retards selected ones of the pulses applied to the storage means.

7. A distortion signal generator including
means for temporarily storing a signal to be distorted,
means for supplying a signal to said storage means,
means for generating a series of pulses at a fixed frequency,
means for applying the pulses to the storage means to cause the signal to be removed from the storage means and supplied to an output line in synchronism with the applied pulses,
means for sensing predetermined conditions in adjacent portions of the signal stored in predetermined portions of the storage means, and
means responsive to the output of the sensing means for changing the relative frequency of selected ones of the pulses applied to the storage means with respect to other pulses of the series to introduce a predetermined amount and type of distortion to the signal on the output line.

8. A signal generator for introducing distortion into a signal consisting of a plurality of binary pulses comprising a shift register, means for supplying the signal in parallel to the shift register with each pulse of the signal being stored in a different stage of the shift register, means for generating a series of pulses recurring at a fixed frequency, means for applying the generated pulses to the shift register as shift pulses to advance the signals from the shift register serially from the output stage of the register in synchronism with the applied pulses, means for sensing at least one predetermined relationship between adjacent binary pulses of the signal, and means responsive to the output of the sensing means for repositioning selected ones of the shift pulses applied to the shift register to cause a predetermined amount and type of distortion to appear in the signal obtained from the output stage of the shift register.

9. A signal generator for introducing distortion into a signal consisting of a plurality of binary pulses comprising a shift register having a plurality of stages greater in number than the number of pulses in the signal, means for supplying the signal in parallel to the shift register with each pulse of the signal being stored in a different stage, means for generating a series of pulses recurring at a fixed frequency, means for applying the generated pulses to the shift register as shift pulses to advance the signals from the shift register serially from the output stage of the register in synchronism with the applied pulses, means connected to a predetermined adjacent pair of the stages of the shift register for sensing at least one predetermined relationship between adjacent binary pulses of the signal, and means responsive to the output of the sensing means for repositioning selected ones of the shift pulses applied to the shift register to cause a predetermined amount and type of distortion to appear in the signal obtained from the output stage of the shift register.

10. A signal generator for introducing distortion into a telegraph character having $n$ binary pulses arranged in permutation code, where $n$ is a positive integer greater than one, including a shift register having at least $n+1$ stages, means for supplying the character in parallel to the first $n$ stages of the shift register with each pulse of the character being stored in a different stage, an oscillator for generating a series of clock pulses, means for applying the clock pulses to the shift register as shift pulses to advance the character pulses into the $n+1$ stage serially in synchronism with the shift pulses, means for selecting the type of distortion desired, coincidence means connected to the output of the distortion selecting means and to the outputs of the $n$th and $n-1$ stages of the shift register for providing an output signal indicative of the coincidence between the output of the distortion selecting means and the existence of a predetermined relationship between the binary pulses temporarily stored in the $n$th and $n-1$ stages, and means responsive to coincidence between the shift pulses and the output of the coincidence means for repositioning selected ones of the shift pulses to introduce a predetermined amount and type of distortion into the character appearing at the output of the $n+1$ stage of the shift register.

11. A signal generator according to claim 10 wherein the repositioning means repositions the next shift pulse to occur after coincidence between a shift pulse and the output of the coincidence means.

12. A signal generator according to claim 11 wherein the repositioning means generates a plurality of outputs with the distortion selecting means passing only one of these outputs as a repositioned shift pulse in accordance with the type of distortion selected.

13. A signal generator according to claim 12 having additional means for automatically operating the distortion selecting means prior to supplying a character to the shift register to impart a different type of distortion to the character from that imparted to the previous character.

References Cited

UNITED STATES PATENTS

| | | | |
|---|---|---|---|
| 2,909,605 | 10/1959 | Gardberg | 178—69 |
| 3,057,958 | 10/1962 | Peterson | 178—69 |

OTHER REFERENCES

Olson: Serial Input-Serial Output Core Storage Device, IBM Technical Disclosure Bulletin, vol. 2, No. 2, pages 69–70, August 1959.

ROBERT C. BAILEY, *Primary Examiner.*

R. M. RICKERT, *Assistant Examiner.*